United States Patent
Seok et al.

(10) Patent No.: US 7,911,561 B2
(45) Date of Patent: Mar. 22, 2011

(54) METHOD OF MANUFACTURING DISPLAY APPARATUS USING ALIGNMENT MARKS

(75) Inventors: Min-Goo Seok, Yongin-si (KR); Woo-Jin Bae, Seoul (KR); Myeong-Ha Kye, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 328 days.

(21) Appl. No.: 12/038,207

(22) Filed: Feb. 27, 2008

(65) Prior Publication Data
US 2008/0273159 A1 Nov. 6, 2008

(30) Foreign Application Priority Data
May 3, 2007 (KR) .................. 10-2007-0043039

(51) Int. Cl.
*G02F 1/1347* (2006.01)
(52) U.S. Cl. .................................... 349/74; 349/187
(58) Field of Classification Search .............. 349/74, 349/81, 187
See application file for complete search history.

(56) References Cited

U.S. PATENT DOCUMENTS

| | | | | |
|---|---|---|---|---|
| 5,936,695 A * | 8/1999 | Hida et al. | | 349/153 |
| 6,320,639 B1 * | 11/2001 | Mori et al. | | 349/155 |
| 2001/0046008 A1 * | 11/2001 | Ueda et al. | | 349/74 |
| 2003/0160939 A1 * | 8/2003 | Webber | | 351/114 |
| 2004/0000368 A1 * | 1/2004 | Kasuga et al. | | 156/64 |
| 2005/0190329 A1 * | 9/2005 | Okumura | | 349/123 |

FOREIGN PATENT DOCUMENTS

| | | |
|---|---|---|
| JP | 6167719 | 6/1994 |
| JP | 2002221699 | 8/2002 |
| JP | 2006091389 | 4/2006 |

* cited by examiner

*Primary Examiner* — Michael H Caley
(74) *Attorney, Agent, or Firm* — H.C. Park & Associates, PLC

(57) ABSTRACT

A display apparatus includes a main display panel and a sub-display panel. The main display panel includes a first main display substrate and a second main display substrate disposed opposite the first main display substrate to overlap the first main display substrate. The sub-display panel includes a first sub-display substrate and a second sub-display substrate disposed opposite the first sub-display substrate to overlap the first sub-display substrate. The first main display substrate includes a first alignment mark and a second alignment mark, the second main display substrate includes a third alignment mark corresponding to the second alignment mark, the first sub-display substrate includes a fourth alignment mark, and the second sub-display substrate includes a fifth alignment mark corresponding to the fourth alignment mark and a sixth alignment mark corresponding to the first alignment mark.

5 Claims, 15 Drawing Sheets

METHOD OF MANUFACTURING DISPLAY APPARATUS USING ALIGNMENT MARKS

CROSS-REFERENCE TO RELATED APPLICATION

This application claims priority from and the benefit of Korean Patent Application No. 10-2007-0043039, filed on May 3, 2007, which is hereby incorporated by reference for all purposes as if fully set forth herein.

BACKGROUND OF THE INVENTION

1. Field of the Invention

The present invention relates to a display apparatus and a method of manufacturing the same, and more particularly, to a display apparatus having a pair of display panels that overlap each other and a manufacturing method thereof.

2. Discussion of the Background

There are various kinds of display apparatuses. One kind of display apparatus includes a liquid crystal display (LCD) panel. The performance of LCD panels has improved and LCD panels have gradually become miniaturized and lightweight, due in part to rapidly developing semiconductor technology.

In other words, a display apparatus including an LCD panel is advantageous in that it may be small and lightweight and has low electric power consumption. Thus, such display apparatuses have gradually begun to replace cathode ray tubes (CRTs) because they can overcome the shortcomings associated with CRTs. At present, LCD panels are mounted and used in almost all data processing apparatuses, including medium/large products such as monitors or TVs, as well as small products such as cellular phones, personal digital assistants (PDAs), and portable multimedia players (PMPs).

However, display apparatuses equipped with respective LCD panels have a limited contrast ratio. Accordingly, conventional display apparatuses have used a polarizer or a functional film to improve the contrast ratio. However, it has been difficult to secure a high contrast ratio of 10,000:1 or higher using these conventional contrast ratio heightening methods.

SUMMARY OF THE INVENTION

The present invention provides a display apparatus that includes a plurality of display panels and may have an improved contrast ratio.

The present invention also provides a method of efficiently manufacturing a display apparatus that includes a plurality of display panels and may have an improved contrast ratio.

Additional features of the invention will be set forth in the description which follows, and in part will be apparent from the description, or may be learned by practice of the invention.

The present invention discloses a display apparatus including a main display panel and a sub-display panel. The main display panel includes a first main display substrate and a second main display substrate disposed opposite the first main display substrate to overlap the first main display substrate. The sub-display panel includes a first sub-display substrate and a second sub-display substrate disposed opposite the first sub-display substrate to overlap the first sub-display substrate. The first main display substrate includes a first alignment mark and a second alignment mark, the second main display substrate includes a third alignment mark corresponding to the second alignment mark, the first sub-display substrate includes a fourth alignment mark, and the second sub-display substrate includes a fifth alignment mark corresponding to the fourth alignment mark and a sixth alignment mark corresponding to the first alignment mark.

The present invention also discloses a method of manufacturing a display apparatus including providing a first main display substrate having a first alignment mark and a second alignment mark, providing a second main display substrate having a third alignment mark, providing a second sub-display substrate having a fourth alignment mark, providing a first sub-display substrate having a fifth alignment mark and a sixth alignment mark, aligning the first main display substrate opposite the second main display substrate using the second alignment mark and the third alignment mark to form a main display panel, aligning the second sub-display substrate opposite the first sub-display substrate using the fourth alignment mark and the fifth alignment mark to form a sub-display panel, and aligning the main display panel opposite the sub-display panel using the first alignment mark and the sixth alignment mark.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further specification, illustrate embodiments of the invention and together with the description serve to explain the principles of the invention.

DETAILED DESCRIPTION OF THE ILLUSTRATED EMBODIMENTS

Figure 1:
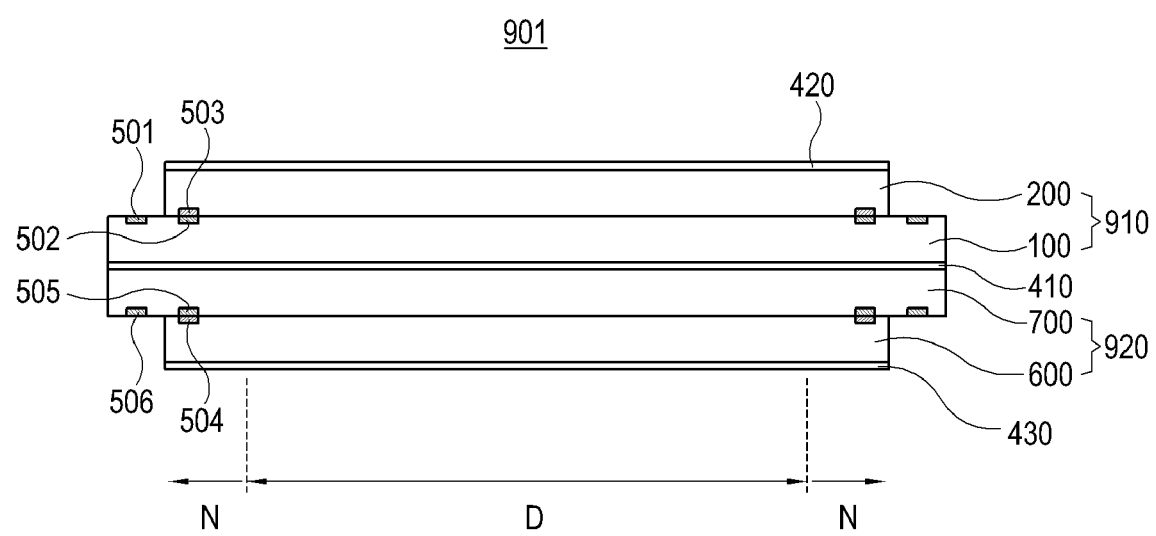
FIG. 1 is a cross-sectional view showing a display apparatus according to a first exemplary embodiment of the present invention.

The invention is described more fully hereinafter with reference to the accompanying drawings, in which embodiments of the invention are shown. The invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

A display panel using an amorphous silicon (a-Si) thin film transistor (TFT) formed through five masks process is schematically shown in the accompanying drawings.

Also, among several exemplary embodiments, a first exemplary embodiment will be representatively described, and the other exemplary embodiments will be described only with respect to the components differing from those of the first exemplary embodiment.

As shown in FIG. 1, a display apparatus 901 according to a first exemplary embodiment of the present invention includes a main display panel 910 and a sub-display panel 920 that is arranged to oppose and overlap the main display panel 910. Each display panel 910 or 920 has a plurality of pixels to express images. The pixels of the main display panel 910 correspond to those of the sub-display panel 920. Here, a pixel represents a minimum unit to express an image. The main display panel 910 includes a color filter 230 (shown in FIG. 5) and expresses an image. The sub-display panel 920 does not includes a color filter and heightens the contrast ratio, that is, the gray scale ratio, of an image that is displayed in the main display panel 910. Thus, the main display panel 910 expresses full colors and the sub-display panel 920 expresses only achromatic colors of black and white. The sub-display panel 920 may control the gray scale representation, which may improve the contrast ratio of image displayed in the main display panel 910.

The main display panel 910 includes a first main display substrate 100 and a second main display substrate 200, and the sub-display panel 920 includes a first sub-display substrate 600 and a second sub-display substrate 700. In addition, the display apparatus 901 further includes polarizing plates 410 and 420 that are arranged on the rear surface of the first main display substrate 100 and the front surface of the second main display substrate 200, respectively. Hereafter, the polarizing plate that is attached to the rear surface of the first main display substrate 100 is referred to as the first polarizing plate 410 and the polarizing plate that is attached to the front surface of the second main display substrate 200 is referred to as the second polarizing plate 420.

In addition, the display apparatus 901 may include a polarizing plate 430 that is arranged on the rear surface of the first sub-display substrate 600. However, the polarizing plate that is arranged on the rear surface of the first sub-display substrate 600 is not indispensable and may be omitted depending on the kind of sub-display panel 920. Hereafter, the polarizing plate that is attached on the rear surface of the first sub-display substrate 600 is referred to as the third polarizing plate 430.

The first main display substrate 100 includes a first alignment mark 501 and a second alignment mark 502, and the second main display substrate 200 includes a third alignment mark 503. The first sub-display substrate 600 includes a fourth alignment mark 504, and the second sub-display substrate 700 includes a fifth alignment mark 505 and a sixth alignment mark 506.

Here, the first main display substrate 100 is larger than the second main display substrate 200, and the second sub-display substrate 700 is larger than the first sub-display substrate 600. The first alignment mark 501 is formed in a region of the first main display substrate 100 that does not overlap the second main display substrate 200. The sixth alignment mark 506 is formed in a region of the second sub-display substrate 700 that does not overlap the first sub-display substrate 600. The second alignment mark 502 and the third alignment mark 503 are formed in respective regions of the first main display substrate 100 and the second main display substrate 200 that overlap each other. The fourth alignment mark 504 and the fifth alignment mark 505 are formed in respective regions of the first sub-display substrate 600 and the second sub-display substrate 700 that overlap each other.

The second alignment mark 502 of the first main display substrate 100 corresponds to and faces the third alignment mark 503 of the second main display substrate 200. That is, the first main display substrate 100 and the second main display substrate 200 are arranged using the second alignment mark 502 and the third alignment mark 503. Then, the first main display substrate 100 and the second main display substrate 200 are coupled together to form the main display panel 910.

The fourth alignment mark 504 of the first sub-display substrate 600 corresponds to and faces the fifth alignment mark 505 of the second sub-display substrate 700. That is, the first sub-display substrate 600 and the second sub-display substrate 700 are arranged using the fourth alignment mark 504 and the fifth alignment mark 505. Then, the first sub-display substrate 600 and the second sub-display substrate 700 are coupled together to form the sub-display panel 920.

The first alignment mark 501 of the first main display substrate 100 corresponds to and opposes the sixth alignment mark 506 of the second sub-display substrate 700. That is, the main display panel 910 and the sub-display panel 920 are arranged using the first alignment mark 501 of the first main display substrate 100 and the sixth alignment mark 506 of the second sub-display panel 700. Then, the main display panel 910 and the sub-display panel 920 are coupled together to form the display apparatus 901. Here, the first polarizing plate 410 is disposed between the main display panel 910 and the sub-display panel 920.

Figure 2:
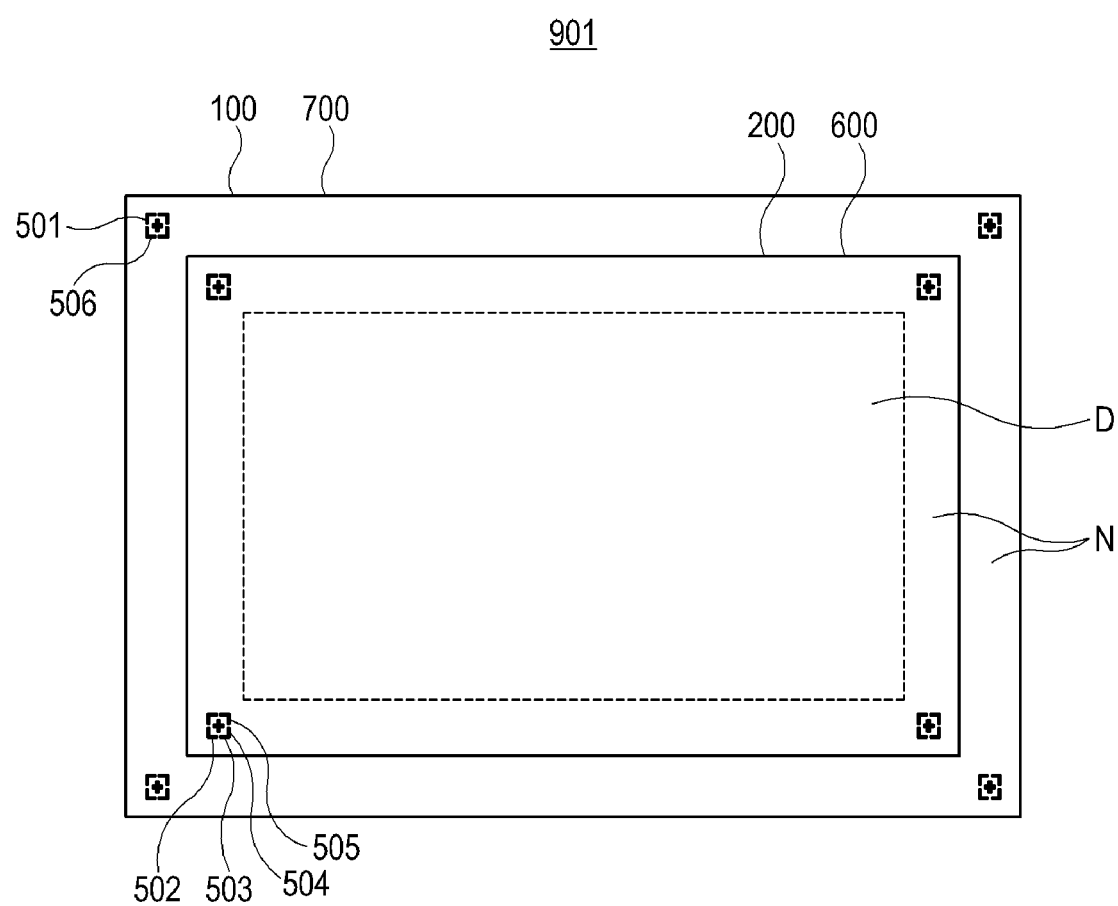
FIG. 2 is plan view of the display apparatus of FIG. 1.

FIG. 2 is a plan view of the display apparatus 901 of FIG. 1.

As shown in FIG. 2, the first alignment mark 501 and the sixth alignment mark 506 overlap each other, and the second alignment mark 502, the third alignment mark 503, the fourth alignment mark 504, and the fifth alignment mark 505 overlap each other.

Figure 3:
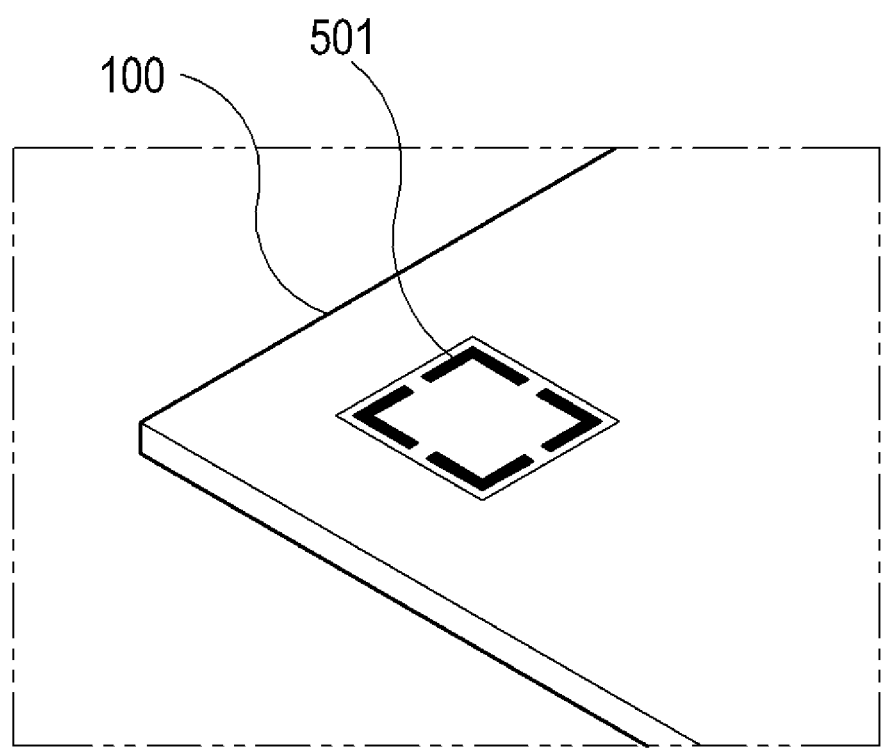
FIG. 3 is an enlarged perspective view of a first alignment mark of FIG. 1.
Figure 4:
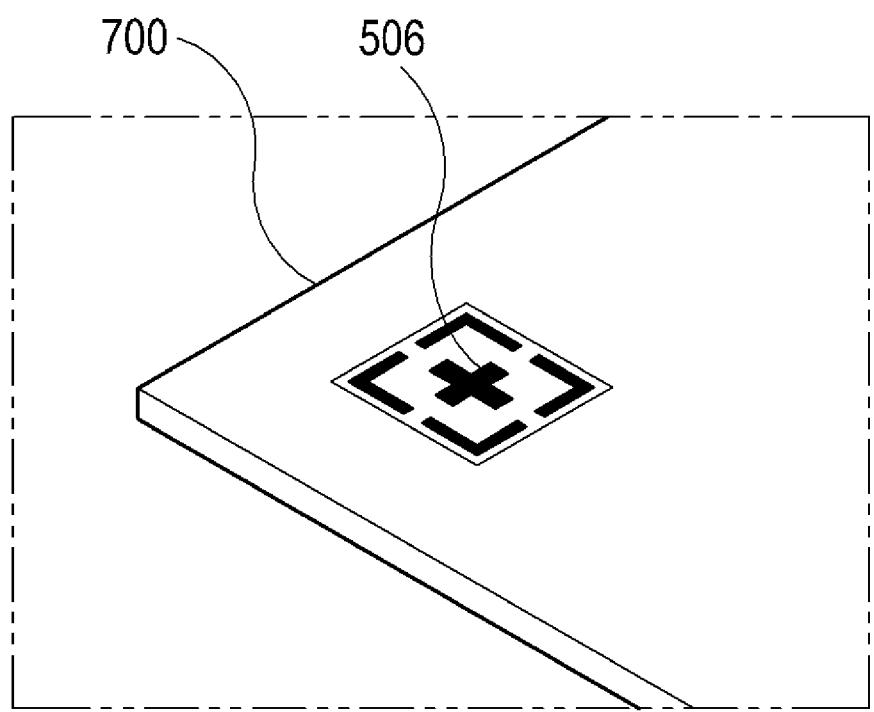
FIG. 4 is an enlarged perspective view of a sixth alignment mark of FIG. 1.

Here, the first alignment mark 501 may include a square outline, as shown in FIG. 3. As shown in FIG. 4, the sixth alignment mark 506 may have a cross shape that fits within the outline of the first alignment mark 501.

However, other embodiments are possible. For example, the shape of the first alignment mark 501 may be replaced by the shape of the sixth alignment mark 506. Alternatively, the first alignment mark 501 and the sixth alignment mark 506 may have various other shapes.

With this structure, the contrast ratio of the display apparatus 901 may be improved. In addition, a display apparatus 901 with an improved contrast ratio may be effectively manufactured. That is, a plurality of display panels 910 and 920 may be effectively aligned and disposed.

Figure 5:
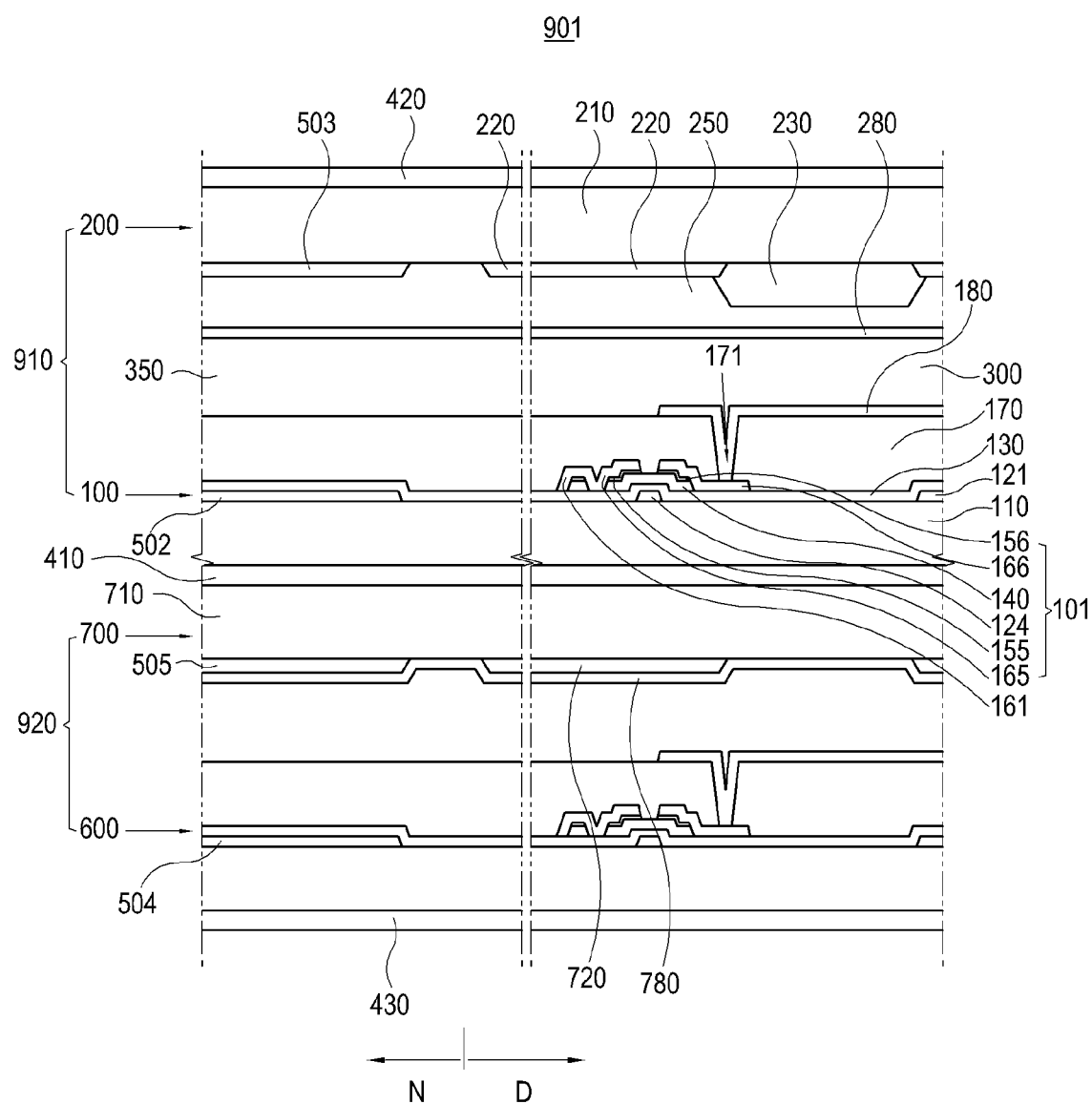
FIG. 5 is a partially enlarged cross-sectional view of the display apparatus of FIG. 1.

Referring to FIG. 5, the inner structure of the main display panel 910 and the sub-display panel 920 will be described in more detail. The main display panel 910 and the sub-display panel 920 are divided into a display area D, where an image is displayed, and a non-display area N, which is located in the periphery of the display area D.

First, the display area D of the main display panel 910 will be described in detail.

The first main display substrate 100 includes a first main substrate member 110 and several layers formed on the first main substrate member 110. The first main substrate member 110 may be transparent and may include glass, quartz, ceramic, or plastic.

Gate wirings, including gate lines 121 and gate electrodes 124 branched from the gate lines 121, are formed on the first main substrate member 110. Although not shown, the gate wirings may further include first storage lines.

The gate wirings 121 and 124 may include Al, Ag, Cr, Ti, Ta, Mo, or an alloy thereof. Although the gate wirings 121 and 124 have been shown as a single layer in FIG. 5, the gate wirings 121 and 124 may have a multilayer structure including a metal layer having excellent physical and chemical properties and including Cr, Mo, Ti, Ta, or an alloy thereof and a metal layer having small specific resistance and including an Al-series or Ag-series metal. Alternatively, the gate wirings 121 and 124 may include various other metals or electric conductors. For example, the gate wirings 121 and 124 may have a multilayer structure including layers that can be patterned under identical etching conditions.

A gate insulation layer 130, which may include silicon nitride (SiNx), is formed on the gate wirings 121 and 124.

Data wirings including data lines 161 crossing the gate lines 121, source electrodes 165 branched from the data lines 161, and drain electrodes 166 spaced apart from the source electrode 165 are formed on the gate insulation layer 130. Although not shown, the data wirings 161, 165, and 166 may further include second storage lines that overlap the first storage lines (not shown).

The data wirings 161, 165, and 166, like the gate wirings 121 and 124, may include a conductive material such as a metal of Cr, Mo, Al, or an alloy thereof, and may be a single layer or a multilayer structure.

A semiconductor layer 140 is formed on an area of the gate insulation layer 130 that is on the gate electrode 124. The semiconductor layer 140 may include amorphous silicon. Here, the gate electrode 124, the source electrode 165, and the drain electrode 166 are three electrodes of a thin film transistor 101. The semiconductor layer 140 between the source electrode 165 and the drain electrode 166 becomes a channel region of the thin film transistor 101.

Ohmic contact layers 155 and 156 are formed to reduce the contact resistance between the semiconductor layer 140 and the source electrode 165 and between the semiconductor layer 140 and the drain electrode 166, respectively. The ohmic contact layers 155 and 156 may include silicide or amorphous silicon heavily doped with n-type impurities.

A passivation layer 170, which may include a low permittivity insulating material of a-Si:C:O or a-Si:O:F that is formed through plasma enhanced chemical vapor deposition (PECVD), an inorganic insulating material of silicon nitride, or silicon oxide, is formed on the data wirings 161, 165, and 166.

Although not shown, an organic layer having excellent planarization properties and photosensitivity may be formed on the passivation layer 170.

A plurality of pixel electrodes 180 is formed on the passivation layer 170. The pixel electrodes 180 may include a transparent conductive material, such as indium tin oxide (ITO) or indium zinc oxide (IZO), or an opaque conductive material having an excellent light reflection property, such as aluminum (Al).

In addition, the passivation layer 170 has a plurality of contact holes 171 that partially expose the respective drain electrodes 166. Each pixel electrode 180 and drain electrode 166 are connected through the respective contact hole 171.

The second main display substrate 200 includes a second main substrate member 210 and a plurality of layers formed on the second main substrate member 210. Like the first main substrate member 110, the second main substrate member 210 may be transparent and may include glass, quartz, ceramic, or plastic.

A first light interception layer 220 is formed on a surface of the second main substrate member 210 opposing the first main substrate member 110. The first light interception layer 220 has an opening opposing the pixel electrode 180 and intercepts light leaking between the neighboring pixels. The first light interception layer 220 also corresponds to the thin film transistor 101 to intercept external light incident to the semiconductor layer 140 of the thin film transistor 101.

The first light interception layer 220 may include a metal material or a photosensitive organic material in which black pigment is added. For example, carbon black or titanium oxide may be used as the black pigment.

Color filters 230 having three primary colors are sequentially arranged on the second main substrate member 210, on which the first light interception layer 220 has been formed. However, the colors of the color filters 230 may have other colors besides the three primary colors. The color filters 230 of FIG. 5 are located near the second main substrate member 210, but may have different locations. For example, the color filters 230 may be formed on the first main substrate member 110.

A planarization layer 250 is formed on the first light interception layer 220 and the color filters 230. However, the planarization layer 250 may be omitted.

A common electrode 280, which forms an electric field together with the pixel electrode 180, is formed on the planarization layer 250. The common electrode 280 may include a transparent conductive material, such as ITO or IZO.

In addition, a liquid crystal layer 300 is arranged between the common electrode 280 and the pixel electrode 180. Although not shown, an orientation layer may be respectively formed on the common electrode 280 and the pixel electrode 180. The orientation layer orients liquid crystal molecules of the liquid crystal layer 300 in a predetermined direction.

A non-display area N of the main display panel 100 will be described in detail referring FIG. 1 and FIG. 2.

The first main display substrate 100 and the second main display substrate 200 include alignment marks 501, 502, and 503 formed in the non-display area N.

The first alignment mark 501 and the second alignment mark 502 are formed on the first main display substrate 100 in the non-display area N. The first alignment mark 501 and the second alignment mark 502 may be formed from the same layer as the gate wirings 121 and 124 or may be formed from the same layer as the data wirings 161, 165, and 166. In addition, one of the gate insulation layer 130, the passivation layer 170, and the semiconductor layer 140 may be colored and used as the first alignment mark 501 and the second alignment mark 502.

The third alignment mark 503 is formed on the second main display substrate 200 in the non-display area N. The third alignment mark 503 may be formed from the same layer as the first light interception layer 220.

The second alignment mark 502 corresponds to the third alignment mark 503, and the first alignment mark 501 is formed in a portion of the non-display area N on the first main display substrate 100 that does not overlap the second main display substrate 200.

In addition, a sealant 350 is formed between the first main display substrate 100 and the second main display substrate 200 in the non-display area N to couple the first main display substrate 100 and the second main display substrate 200.

Next, the sub-display panel 920 will be described referring FIG. 1, FIG. 2, and FIG. 5. The sub-display panel 920 according to the first exemplary embodiment of the present invention has a structure similar to that of the main display panel 910 except that color filters have been omitted in the sub-display panel 920.

The first sub-display substrate 600 of the sub-display panel 920 is formed in substantially the same manner as the first main display substrate 100 of the main display panel 910. The first sub-display substrate 600 includes a fourth alignment mark 504 formed in the non-display area N. The fourth alignment mark 504 may be formed in the same manner as the first alignment mark 501 and the second alignment mark 502.

The second sub-display substrate 700 of the sub-display panel 920 is formed in substantially the same manner as the second main display substrate 200 of the main display panel 910 except that color filters are omitted. In addition, a planarization layer may be omitted in the second sub-display substrate 700 of the sub-display panel 920. That is, the second sub-display substrate 700 includes a second sub-substrate member 710, a second light interception layer 720, and a common electrode 780, which are formed on the second sub-substrate member 710. Here, the second light interception layer 720 has an opening and the second light interception layer 720 may improve the image quality and the viewing angle of the display apparatus 901.

The second sub-display substrate 700 includes the fifth alignment mark 505 and the sixth alignment mark 506 formed in the non-display area N. The fifth alignment mark 505 and the sixth alignment mark 506 may be formed in the same manner as the third alignment mark 503.

The fourth alignment mark 504 corresponds to the fifth alignment mark 505. The sixth alignment mark 506 is formed in a portion of the non-display area N on the second sub-display substrate 700 that does not overlap the first sub-display substrate 600. As shown in FIG. 1, the first alignment mark 501 corresponds to the sixth alignment mark 506.

In addition, a first polarizing plate 410, a second polarizing plate 420, and a third polarizing plate 430 are attached between the main display panel 910 and the sub-display panel 920, on the front surface of the main display panel 910, and on the rear surface of the sub-display panel 920, respectively. That is, the display apparatus 901 includes a total of three polarizing plates 410, 420, and 430. Here, the polarizer of the first polarizing plate 410 polarizes light in a direction crossing the polarizers of the second polarizing plate 420 and the third polarizing plate 430.

An active matrix (AM) type liquid crystal display panel has been used as the sub-display panel 920 according to the first exemplary embodiment of the present invention, but the present invention is not limited thereto. Therefore, a passive matrix (PM) type liquid crystal display panel or a guest-host liquid crystal display panel may be used as the sub-display panel 920. That is, since the sub-display panel 920 provides only black and white expression, a liquid crystal display panel having a relatively simple structure may be used as the sub-display panel 920. The PM type liquid crystal display panel and the guest-host liquid crystal display panel are advantageous in that their structures are simple and they may be relatively inexpensive to manufacture. Moreover, when a guest-host liquid crystal display panel is used as the sub-display panel 920, the third polarizing plate 430, which is attached to the rear surface of the sub-display panel 920, may be omitted.

Also, while the sub-display panel 920 is arranged to face the rear surface of the main display panel 910 in the first exemplary embodiment of the present invention, different arrangements are possible. For example, sub-display panel 920 may be arranged to face the front surface of the main display panel 910.

With this structure, a plurality of display panels 910 and 920 may be effectively aligned, which may improve the contrast ratio of the display apparatus 901.

Figure 6:
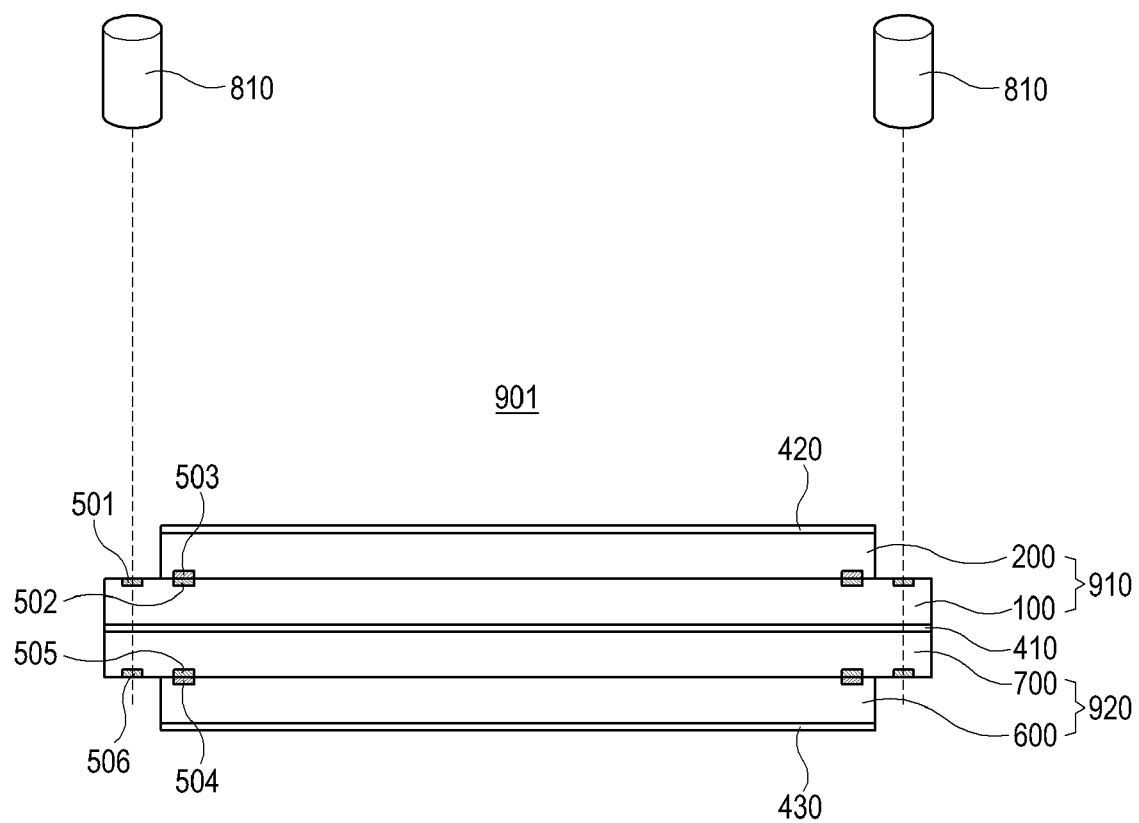
FIG. 6 is a cross-sectional view for explaining a method of manufacturing the display apparatus of FIG. 1.

Referring to FIG. 6, a method of manufacturing the display apparatus 901 will be described in detail.

The first main display substrate 100 having the first alignment mark 501 and the second alignment mark 502, the second main display substrate 200 having the third alignment mark 503, the first sub-display substrate 600 having the fourth alignment mark 504, and the second sub-display substrate 700 having the fifth alignment mark 505 and the sixth alignment mark 506, are formed.

The first main display substrate 100 and the second main display substrate 200 are arranged to oppose each other using the second alignment mark 502 and the third alignment mark 503. Then, the first main display substrate 100 and the second main display substrate 200 are coupled together to form the main display panel 910. Here, a first polarizing plate 410 and a second polarizing plate 420 are attached to the rear surface of the first main display substrate 100 and to the front surface of the second main display substrate 200, respectively.

Then, the first sub-display substrate 600 and the second sub-display substrate 700 are aligned to oppose each other using the fourth alignment mark 504 and the fifth alignment mark 505. Then, the first sub-display substrate 600 and the second sub-display substrate 700 are coupled together to form the sub-display panel 920. Here, the third polarizing plate 430 is attached to the rear surface of the first sub-display substrate 600.

The first main display substrate 100 is adhered to the second main display substrate 200 and the first sub-display substrate 600 is adhered to the second sub-display substrate 700 using the sealant 350 (shown in FIG. 5).

Then, the main display panel 910 and the sub-display panel 920 are aligned to oppose each other using the first alignment mark 501 and the sixth alignment mark 506 using a camera unit 810. The main display panel 910 and the sub-display panel 920 are coupled together to form the display apparatus 901.

That is, the camera unit 810 is used to confirm whether the first alignment mark 501 and the sixth alignment mark 506 are congruent, thus aligning the main display panel 910 and the sub-display panel 920.

In more detail, the camera unit 810 focuses on the first alignment mark 501 of the first main display substrate 100 and confirms whether the first alignment mark 501 and the sixth alignment mark 506 are congruent. The camera unit 810 identifies the sixth alignment mark 506 on the second sub-display substrate 700 through the first main display substrate 100. If the camera unit 810 determines that the sixth alignment mark 506 is located inside the first alignment mark 501, it can be confirmed that the main display panel 910 and the sub-display panel 920 have been properly aligned.

Then, parts of the main display panel 910 and the sub-display panel 920, where the respective alignment marks 501, 502, 503, 504, 505, and 506 have been formed, may be cut and removed as needed.

Using the display apparatus manufacturing method described above, a plurality of display panels 910 and 920 may be effectively aligned.

A second exemplary embodiment of the present invention will be described with reference to FIG. 7.

Figure 7:
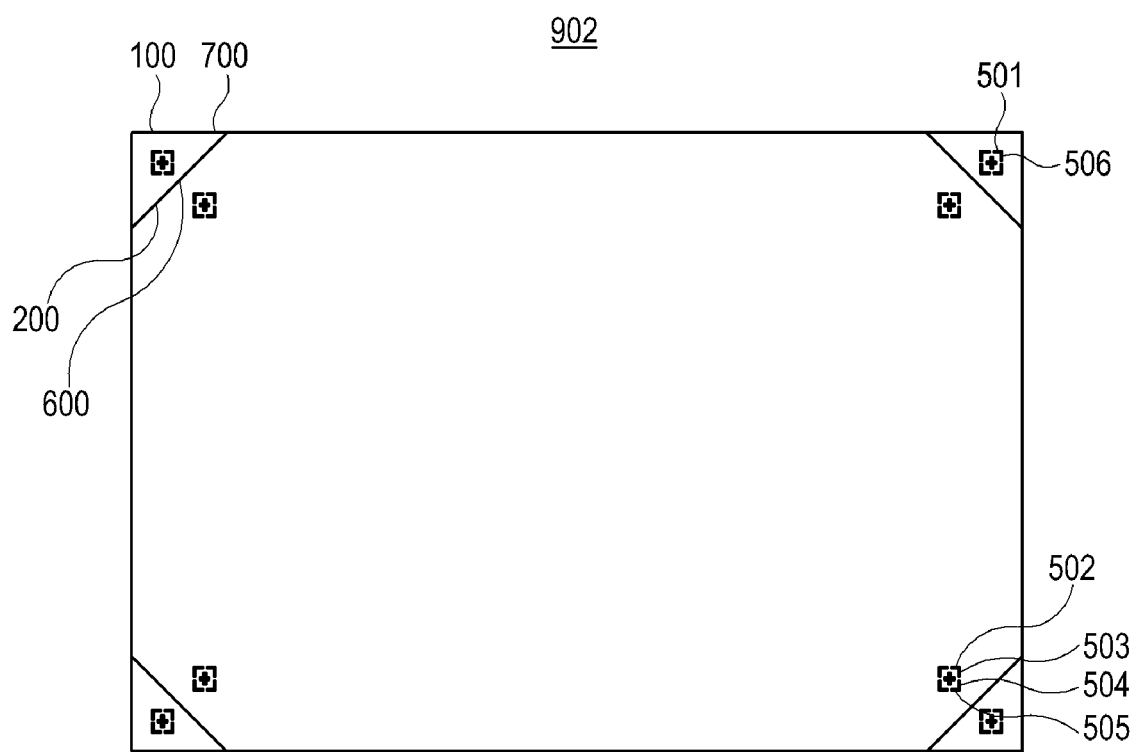
FIG. 7 is a cross-sectional view showing a display apparatus according to a second exemplary embodiment of the present invention.

As shown in FIG. 7, a display apparatus 902 includes a second main display substrate 200 having cut corner areas. That is, a first main display substrate 100 and the second main display substrate 200 have the same shape except in the corner areas. The corner areas of the second main display substrate 200 are cut to expose the corner areas of the first main display substrate 100. Thus, a first alignment mark 501 is formed each corner area of the first main display substrate 100.

In addition, the display apparatus 902 includes a first sub-display substrate 600 having cut corner areas. That is, the first sub-display substrate 600 and a second sub-display substrate 700 have the same shape except in the corner areas, and the corner areas of the first sub-display substrate 600 are cut to expose the corner areas of the second sub-display substrate 700. Thus, a sixth alignment mark 506 is formed in each corner area of the second sub-display substrate 700.

The main display panel 910 and the sub-display panel 920 may be aligned using the first alignment mark 501 of the first main display substrate 100 and the sixth alignment mark 506 of the second sub-display substrate 700.

With this structure, a plurality of display panels 910 and 920 may be effectively aligned, which may improve the contrast ratio of the display apparatus 902.

Figure 8:
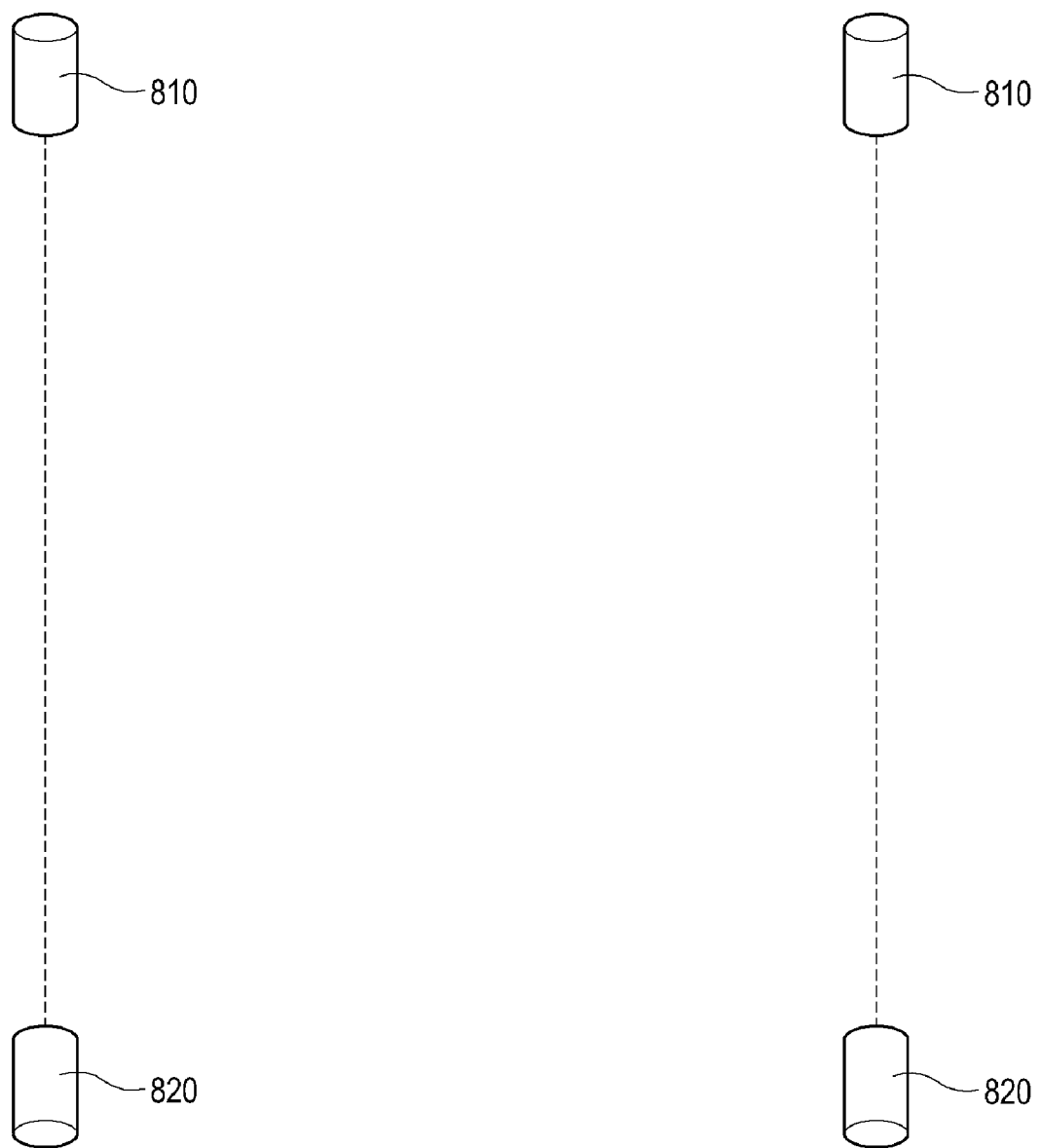
FIG. 8, FIG. 9, FIG. 10, and FIG. 11 are views showing a method of manufacturing a display apparatus according to a third exemplary embodiment of the present invention.
Figure 10:
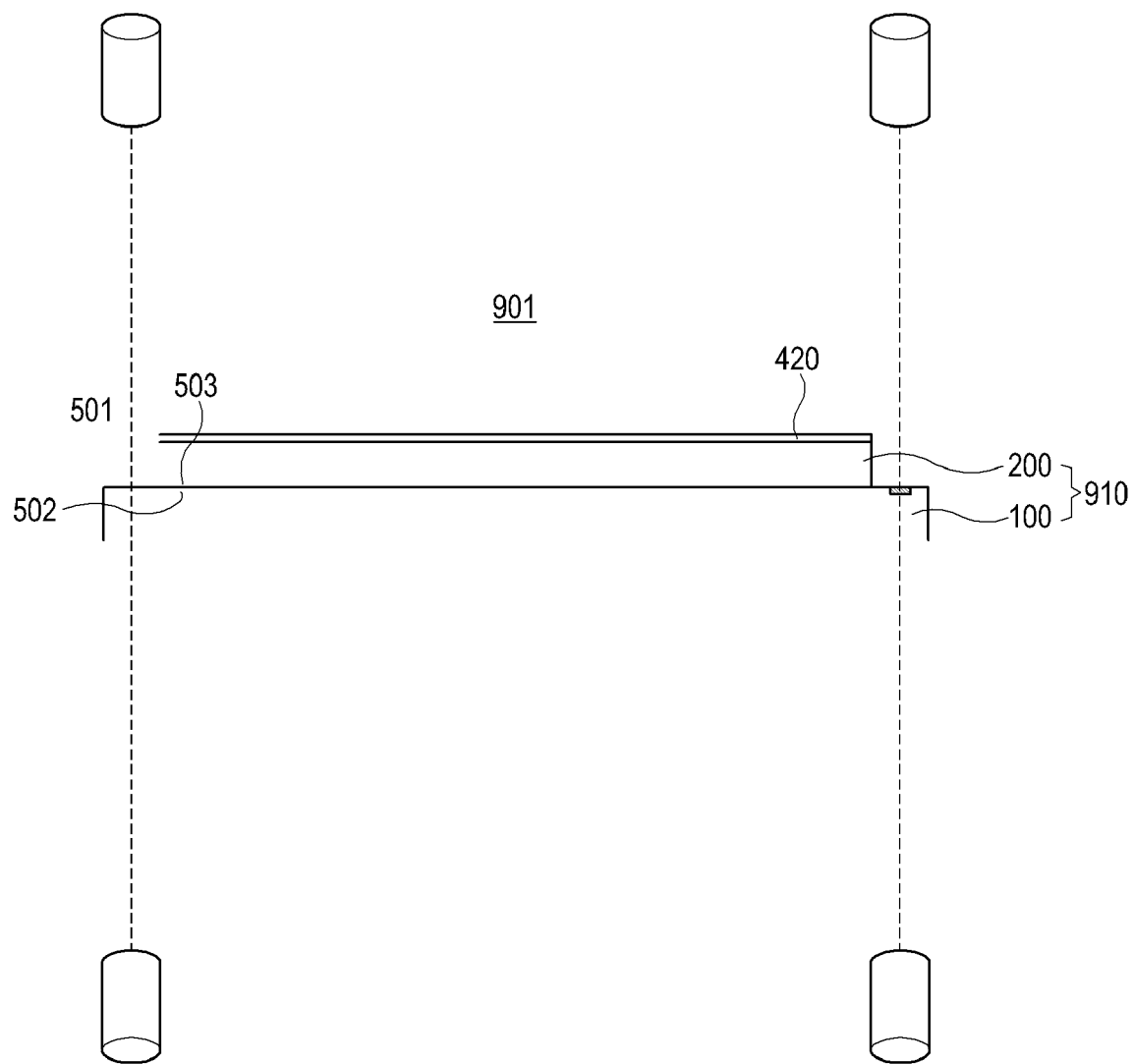
Figure 11:
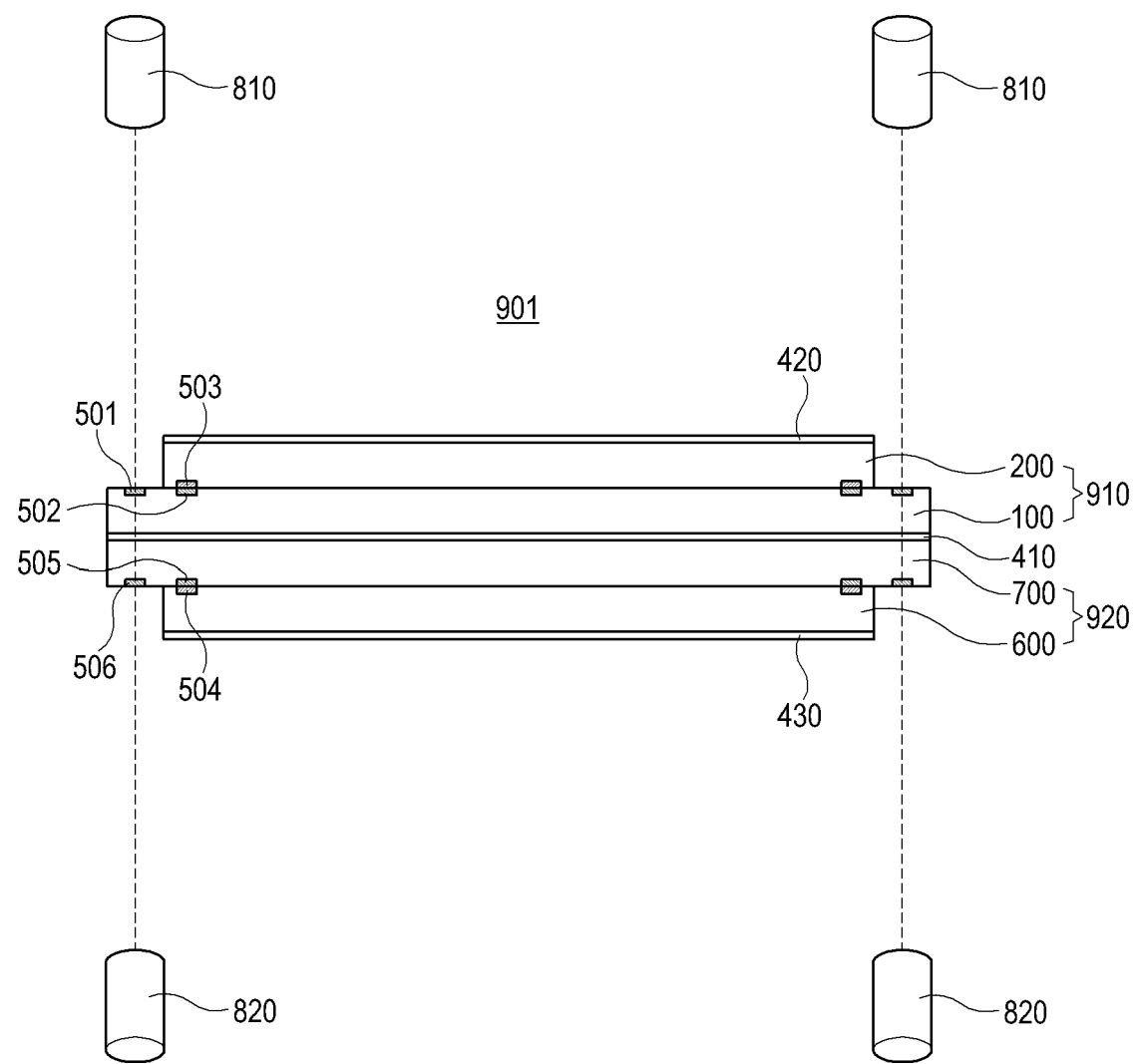

A third exemplary embodiment of the present invention will be described with reference to FIG. 8, FIG. 9, FIG. 10, and FIG. 11. FIG. 8, FIG. 10, and FIG. 11 sequentially show a display apparatus manufacturing method according to the third exemplary embodiment of the present invention.

First, as shown in FIG. 8, a pair of cameras 810 and 820 that face each other are set in position. In detail, the picture-taking directions of a first camera 810 and a second camera 820 are aligned in a straight line.

Figure 9:
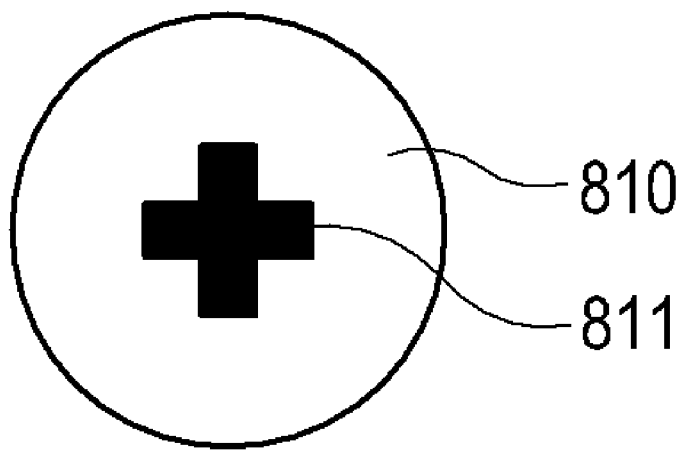

Here, as shown in FIG. 9, at least one of the first camera 810 and the second camera 820 have a target 811 formed on a surface opposing the other of the first camera 810 and the second camera 820. The picture-taking directions of the first camera 810 and the second camera 820 are aligned along a straight line, based on the target 811. For example, if the first camera 810 includes a target 811, the second camera 820 may focus on the target 811 of the first camera 810 to align the picture-taking directions of the cameras 810 and 820 along the same straight line.

Next, as shown in FIG. 10, the main display panel 910 is disposed between the first camera 810 and the second camera 820. Then, the first alignment mark 501 of the main display panel 910 is identified by the first camera 810 to align the main display panel 910.

Next, as shown in FIG. 11, the sub-display panel 920 is disposed between the first camera 810 and the second camera 820. Then, the sixth alignment mark 506 of the sub-display panel 920 is identified through the second camera 820 to align the sub-display panel 920.

Because the first camera 810 and the second camera 820 have already been aligned, the main display panel 910 and the sub-display panel 920 are also accurately aligned. Thereafter, the main display panel 910 and the sub-display panel 920 are coupled together to form the display apparatus 901.

In addition, the display apparatus manufacturing method may further include scrapping the alignment marks 501, 502, 503, 504, 505, and 506 after having aligned the main display panel 910 and the sub-display panel 920.

By this manufacturing method, a plurality of display panels 910 and 920 may be effectively aligned.

A fourth exemplary embodiment of the present invention will be described with reference to FIG. 12, FIG. 13, FIG. 14, and FIG. 15. FIG. 12, FIG. 13, FIG. 14, and FIG. 15 sequentially show the display apparatus manufacturing method according to the fourth exemplary embodiment of the present invention. A laser unit 850 and an optical sensor 860 are used in the fourth exemplary embodiment of the present invention.

Figure 12:
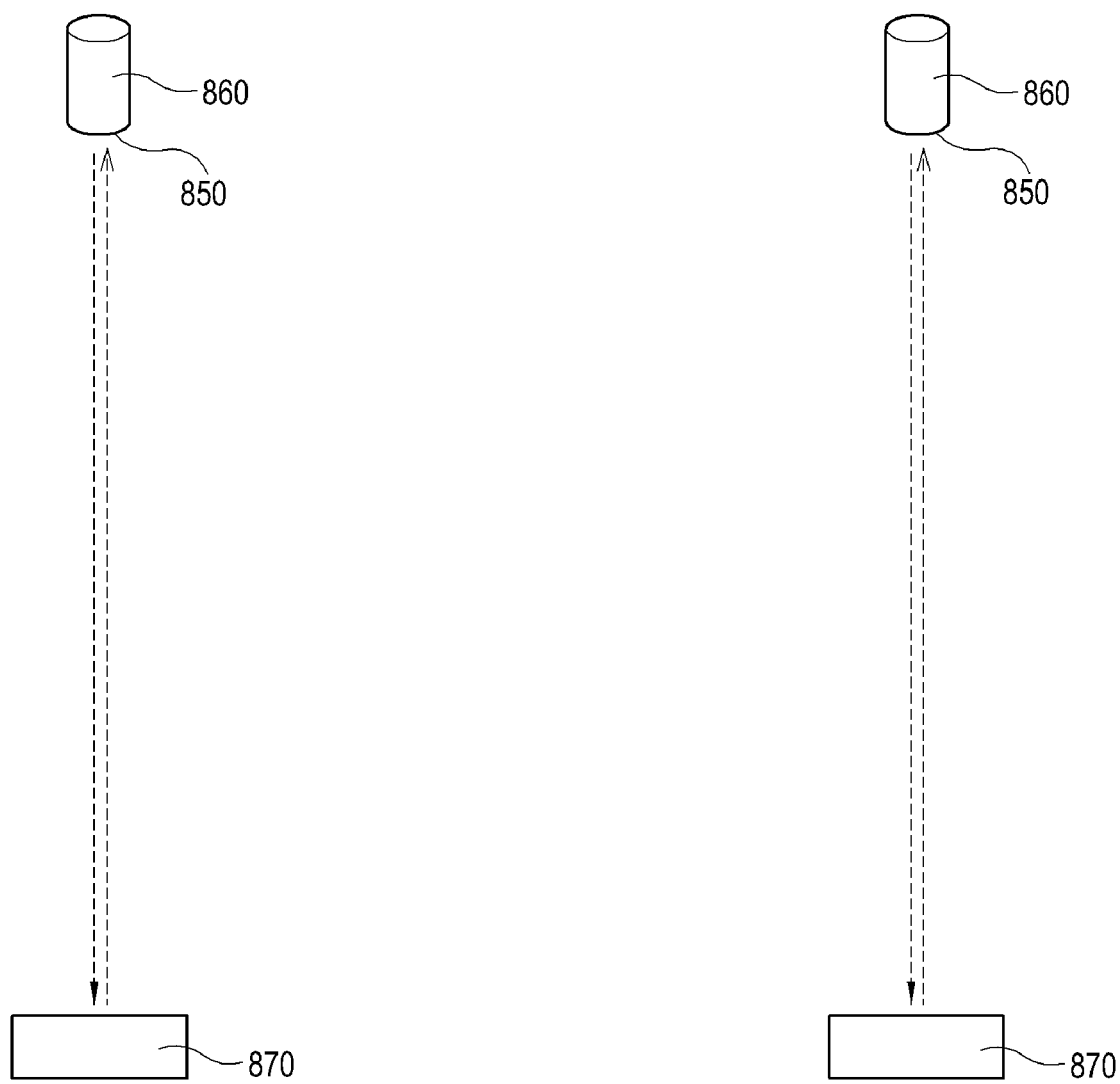
FIG. 12, FIG. 13, FIG. 14, and FIG. 15 are views showing a method of manufacturing a display apparatus according to a fourth exemplary embodiment of the present invention.

First, as shown in FIG. 12, the laser unit 850 and the optical sensor 860 are set in position. In detail, the laser unit 850 and the optical sensor 860 are arranged in substantially the same location, and a reflection member 870 is disposed opposite the laser unit 850 and the optical sensor 860. That is, a laser beam irradiated from the laser unit 850 is reflected by the reflection member 870 and directed toward the optical sensor 860.

Figure 13:
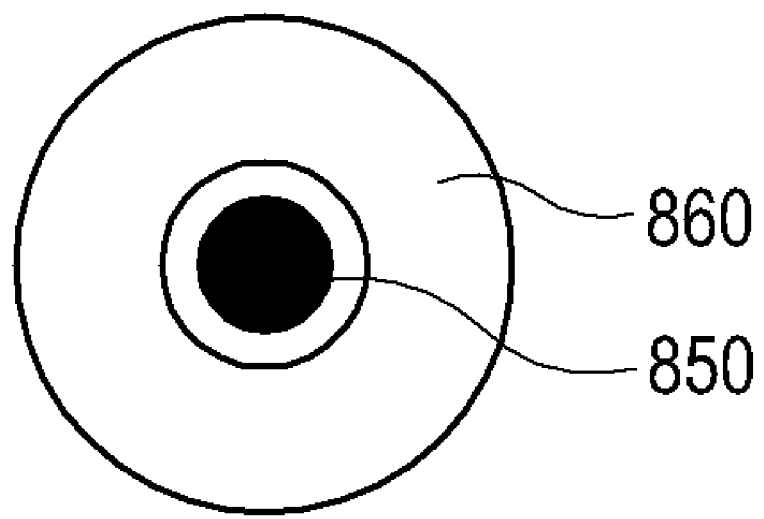

As shown in FIG. 13, the laser unit 850 may be located in the center of the optical sensor 860. The laser beam reflected by the reflection member 870 is detected by the optical sensor 860. Accordingly, the detected laser beam is reflected back toward the optical sensor 860 through the reflection member 870.

Figure 14:
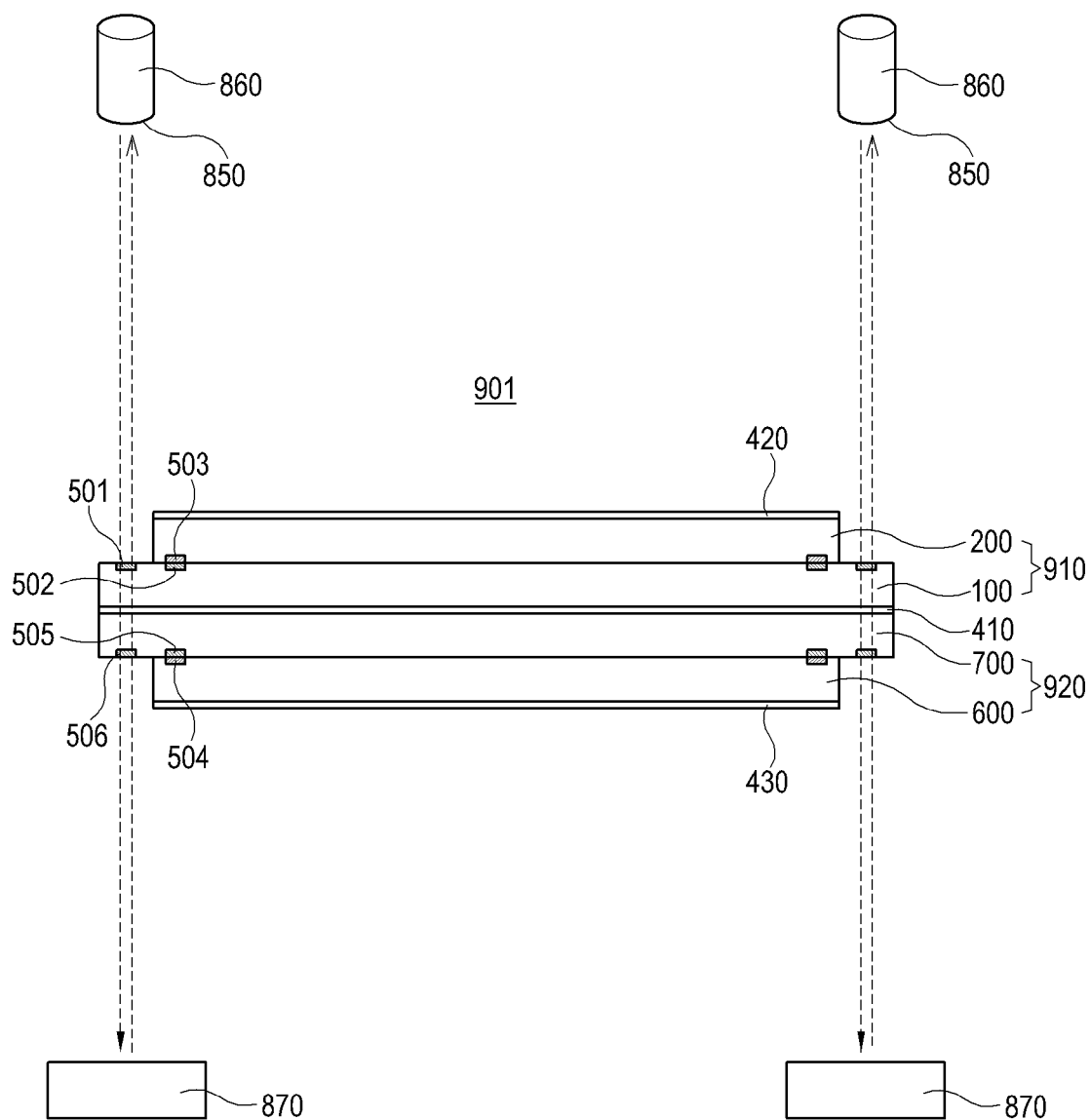

Next, as shown in FIG. 14, the main display panel 910 and the sub-display panel 920 are disposed between the laser unit 850 and the reflection member 870. The first alignment mark 501 formed in the first main display substrate 100 and the sixth alignment mark 506 formed in the second sub-display substrate 700 each include a square outline.

Figure 15:
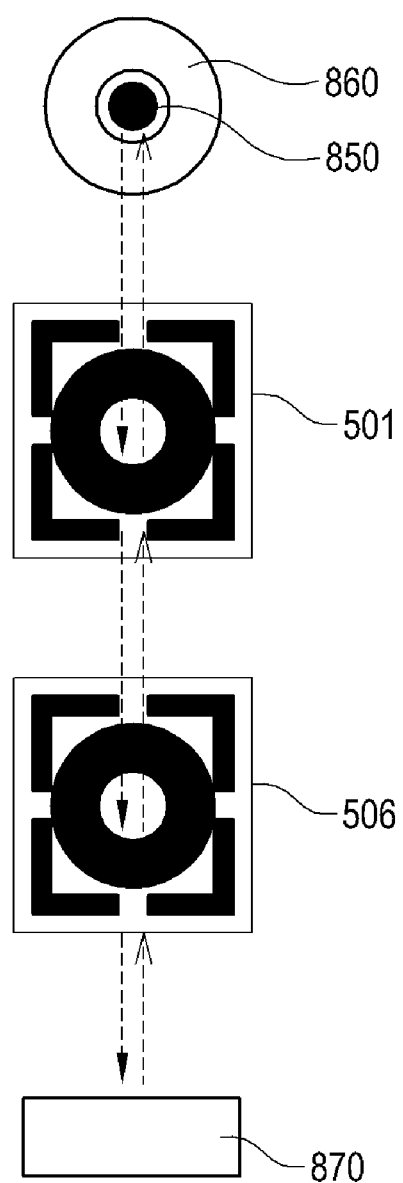

Next, as shown in FIG. 15, the laser beam irradiated from the laser unit 850 passes through the first alignment mark 501 and the sixth alignment mark 506. Then the laser beam is reflected by the reflection member 870 and passes back through the first alignment mark 501 and the sixth alignment mark 506 toward the optical sensor 860. Thus, the laser beam is detected by the optical sensor 860, and then the main display panel 910 and the sub-display panel 920 are aligned through the detected laser beam feedback.

By this manufacturing method, a plurality of display panels 910 and 920 may be effectively aligned.

As described above, the display apparatus according to the present invention may have an improved contrast ratio because it includes a plurality of display panels.

Also, a plurality of display panels may be effectively disposed to form a display apparatus.

In addition, exemplary embodiments of the present invention provide a method of manufacturing a display apparatus that includes a plurality of display panels and may have an improved contrast ratio.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of manufacturing a display apparatus, the method comprising:
   providing a first main display substrate having a first alignment mark and a second alignment mark;
   providing a second main display substrate having a third alignment mark;
   providing a second sub-display substrate having a fourth alignment mark;
   providing a first sub-display substrate having a fifth alignment mark and a sixth alignment mark;
   aligning the first main display substrate opposite the second main display substrate using the second alignment mark and the third alignment mark to form a main display panel;

aligning the second sub-display substrate opposite the first sub-display substrate using the fourth alignment mark and the fifth alignment mark to form a sub-display panel;

aligning picture-taking directions of a first camera and a second camera opposing the first camera in a straight line;

identifying the first alignment mark on the first main display substrate by the first camera to align the main display panel;

identifying the sixth alignment mark on the second sub-display substrate by the second camera to align the sub-display panel; and cutting and removing portions of the main display panel and the sub-display panel where the alignment marks are formed.

2. The method of claim 1, wherein a target is formed on a surface of one of the first camera and the second camera that opposes the other of the first camera and the second camera.

3. A method of manufacturing a display apparatus, the method comprising:

providing a first main display substrate having a first alignment mark and a second alignment mark;

providing a second main display substrate having a third alignment mark;

providing a second sub-display substrate having a fourth alignment mark;

providing a first sub-display substrate having a fifth alignment mark and a sixth alignment mark;

aligning the first main display substrate opposite the second main display substrate using the second alignment mark and the third alignment mark to form a main display panel;

aligning the second sub-display substrate opposite the first sub-display substrate using the fourth alignment mark and the fifth alignment mark to form a sub-display panel;

aligning the main display panel opposite the sub-display panel using the first alignment mark and the sixth alignment mark; and confirming whether or not the first alignment mark and the sixth alignment mark are congruent using a laser unit and an optical sensor, wherein the optical sensor detects whether or not a laser beam irradiated from the laser unit passes through the first alignment mark and the sixth alignment mark.

4. The method of claim 3, wherein the laser unit and the optical sensor are disposed in substantially the same location, and the laser beam irradiated from the laser unit is reflected toward the optical sensor by a reflection member.

5. The method of claim 3, further comprising cutting and removing portions of the main display panel and the sub-display panel where the alignment marks are formed.

* * * * *